Inventors,
Allen N. Salomon,
Jack W. Carson,
by Sidney Greenberg
Their Attorney.

United States Patent Office 3,255,389
Patented June 7, 1966

3,255,389
ELECTRICAL CAPACITOR AND ELECTRODE MATERIAL THEREFOR
Allen N. Salomon, Hudson Falls, and Jack W. Carson, Glens Falls, N.Y., assignors to General Electric Company, a corporation of New York
Filed Apr. 25, 1962, Ser. No. 190,024
6 Claims. (Cl. 317—230)

The present invention relates to electrical capacitors, and more particularly to novel electrode material therefor.

Electrical capacitors, especially those of the electrolytic type, commonly employ metal electrodes on which a thin, dielectric oxide coating has been formed. Heretofore, aluminum and tantalum have been commonly employed as capacitor electrode materials, and while each material has been found particularly useful under certain conditions, they have certain drawbacks. Aluminum, for example, while relatively light weight and inexpensive as compared to tantalum has the disadvantage that its dielectric oxide films has a dielectric constant which is substantially less than that of tantalum. On the other hand, while tantalum electrodes produce capacitors having more stable electrical characteristics and a longer life in relation to other electrode metals such as aluminum, tantalum is often limited in use because of its rather high cost. Moreover, pure tantalum has a rather high density, and in addition to increasing the cost of capacitors, this factor makes the use of this material undesirable in certain applications where low weight is of considerable importance.

Titanium has also been considered heretofore for possible use as a capacitor electrode material in view of the high dielectric constant of its oxide and other good properties such as corrosion resistance and low density. However, it has been found that continuous oxide films for dielectric purposes cannot be formed to acceptable voltage levels on titanium metal by conventional anodizing methods such as used in connection with aluminum, tantalum, and other known capacitor electrode metals.

It is an object of the invention to provide electrical capacitors having a novel film-forming electrode which avoids the disadvantages of electrode materials of the prior art.

It is a particular object of the invention to provide titanium-containing electrodes characterized by good electrical properties and adapted to be readily provided with dielectric oxide films suitable for use in electrical capacitors, and especially in electrolytic capacitors.

With the above objects in view, the present invention relates to an electrical capacitor having a pair of metal electrodes, at least one of the electrodes comprising an alloy of titanium and a minor amount of palladium, the electrode having a dielectric oxide film formed thereon.

Figure 1:
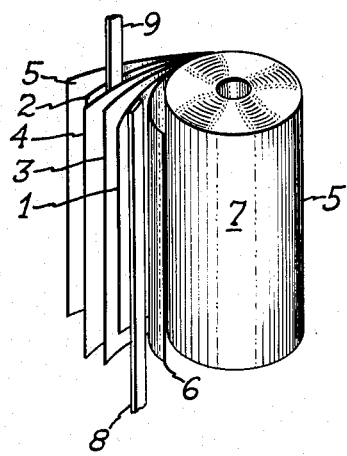
Figure 2:
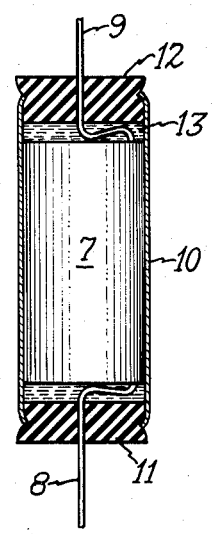
Figure 4:
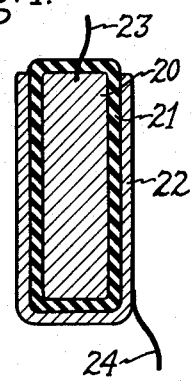
Figure 5:
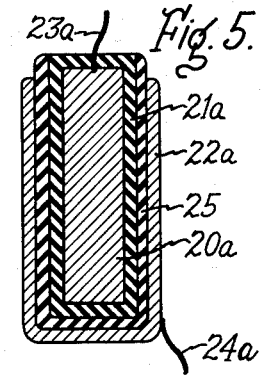

The invention will be better understood from the following description and accompanying drawing in which:

FIG. 1 shows an electrolytic capacitor assembly of rolled type in which the invention may be embodied;
FIG. 2 shows the capacitor assembly of FIG. 1 arranged in a casing; and
FIGS. 3, 4, and 5 illustrate other types of capacitors to which the invention is applicable.

Referring now to the drawing, and particularly to FIG. 1, the capacitor shown comprises a pair of metal foils 1 and 2, one or both of which is composed of a titanium alloy as hereinafter more fully described and having a dielectric oxide film on the surface thereof, the foils in the operation of the capaictor having opposite polarity. Between foils 1 and 2 are one or more sheets of dielectric spacer material 3, 4, 5, and 6 composed conventionally of kraft paper or other suitable spacer material of a porous saturable nature and used to separate the foils. Terminals or tap straps 8 and 9 are secured to the respective foils and extend from the foils in opposite directions. The electrode foils and dielectric sheets are wound into a compact roll 7 prior to insertion into a casing as shown in FIG. 2.

In FIG. 2 the capacitor roll assembly 7 is shown enclosed in a metal casing 10 with terminals 8 and 9 extending respectively through insulating plugs or discs 11, 12 fluid-tightly sealing the interior of the casing. A suitable electrolyte 13 such as an aqueous ammonium pentaborate-glycol solution fills the casing and impregnates the porous spacer material.

Figure 3:
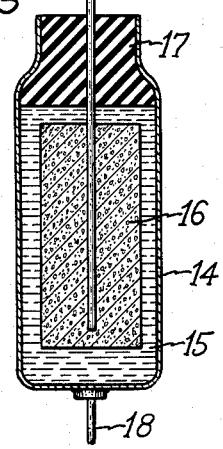

FIG. 3 shows a different type of electrolytic capacitor comprising a casing 14 serving as the cathode and containing an electrolye 15 in which an anode 16 is immersed. Casing 14 may be silver or any metal which does not adversely affect the fill electrolyte or become corroded thereby. In this embodiment, anode 16 is formed of a titanium alloy of the present invention by powder metallurgy techniques, wherein particles of the alloy are pressed and sintered into a porous compact mass or slug in accordance with known processes to provide a large surface area. A film-forming lead wire 19 made of the same alloy, or of aluminum, tantalum or other film-forming metal, is embedded in the slug anode 16 and passes to the exterior of casing 14 through an insulating sealing disc or plug 17 around which casing 14 is crimped to provide a fluid-tight closure for the capacitor. At the opposite end of the capacitor, a cathode lead 18 is suitably joined by welding or otherwise to the outside of the casing 14.

Slug anode 16 of the FIG. 3 capacitor as well as one or both foils 1, 2 of the FIG. 1 capacitor are preferably provided with a thin anodic dielectric oxide film in accordance with anodizing processes well-known in the art.

FIG. 4 diagrammatically shows in exaggerated scale a so-called dry-type capacitor which may embody the invention and which comprises a base electrode 20 composed of a titanium alloy of the invention, an anodic dielectric oxide film 21 overlying the base electrode, and a counter-electrode 22 in the form of a thin metal coating overlying oxide film 21 and spaced thereby from base electrode 20. Electrode layer 22 may be composed of any suitable conducting material such as aluminum, gold, tin, lead, zinc, or the equivalent, and may be applied by any metallizing or other suitable depositing procedure. Leads 23 and 24 are attached by any suitable means to electrodes 20 and 22, respectively.

FIG. 5 shows a dry-type capacitor similar to that of FIG. 4 except that a layer 25 of semi-conductor material such as $MnO_2$ is interposed between the dielectric oxide layer 21a and the counter electrode 22a, the base electrode 20a being composed of a titanium alloy in accordance with the invention.

The base electrode material of the dry-type capacitors of the FIGS. 4 and 5 embodiments, instead of being of solid, integral form as shown, may be composed of a compacted, sintered mass of particles of the titanium alloy, similar to the form of anode shown in FIG. 3. The counter-electrodes of these capacitors may, if desired, be made of combined or composite layers. For example, in the semi-conducting layer embodiment, graphite may be deposited over the semi-conducting layer prior to deposition of an outer metallic conducting layer on the graphite.

It has been found in accordance with the invention that the addition to titanium of a minor amount of palladium of the order of less than 1%, and specifically of .1%, very markedly improves the electrical properties of the anodic films obtained by anodizing the titanium electrode. The titanium alloy of the invention provides unexpectedly good results for capacitor application especially when it is considered that it has generally been the trend in the capacitor art to improve the film-forming characteristics and dielectric properties of metal oxide films by the use of more purified electrode metals rather than by the use of an alloy as in the present invention.

The tables below compare test results obtained on capacitors having electrodes of three different materials as follows:

(A) An alloy composed of 99.9% titanium and .1% palladium,
(B) pure titanium,
(C) pure tantalum.

Table I shows the results obtained using a formation voltage of 20 volts, while Table II shows results obtained with a formation voltage of 75 volts. In preparing the samples, the electrodes were anodized in an electrolyte solution comprising 70% glycolonitrile, the samples being anodized to the different voltages as above-mentioned and the voltage stabilized at this level for ½ to 1½ hours. Each of the thus anodized electrode samples having the compositions above-mentioned was used as the anode in a capacitor containing a fill electrolyte comprising glycol-borate-water solution with a sheet of silver serving as the cathode. The leakage data was obtained after a five-minute period of electrification at 75% of the forming voltage.

TABLE I

| Sample | Capacitance µf. | | Change in Cap., percent | Percent D.F. | Cap., µf./in.² | Leakage Factor, µa./V-µf. |
|---|---|---|---|---|---|---|
| | Original | After 30 Min. | | | | |
| Ti-Pd | 7.39 | 7.37 | −0.3 | 9.0 | 3.69 | 0.0900 |
| Ti | 7.46 | 8.33 | +11.6 | 22.0 | 3.73 | 2.0000 |
| Ta | 7.98 | 7.87 | −1.4 | 10.0 | 3.98 | 0.0062 |

TABLE II

| Sample | Capacitance, µf. | | Change in Cap., percent | Percent D.F. | Csp., µf./in.² | Leakage Factor, µa./V-µf. |
|---|---|---|---|---|---|---|
| | Original | After 30 Min. | | | | |
| Ti-Pd | 2.06 | 2.06 | 0.0 | 3.0 | 1.03 | 0.2400 |
| Ti | 3.27 | 4.00 | +22.3 | 33.0 | 1.64 | 4.5000 |
| Ta | 2.39 | 2.37 | −0.8 | 2.5 | 1.20 | 0.0080 |

Considering the data in Table I obtained with the 20-volt formation, it will be seen that all three samples provided approximately the same initial capacitance. After 30 minutes, however, the capacitance of the titanium-palladium alloy of the invention and the tantalum specimen changed only about 1%, while the pure titanium sample changed 11.6%. Dissipation factors for the titanium-palladium alloy and tantalum had nearly the same value (10%) in contrast to 22% for the pure titanium. Leakage factor for the pure titanium was about 22 times that of the titanium-palladium alloy.

The data in Table II for the 75-volt formation shows the same trend. Capacitance values of tantalum and the titanium-palladium alloy showed a change of less than 1% after 30 minutes, while the pure titanium sample increased by 22%. Both tantalum and titanium-palladium exhibited good dissipation factors of 2.5% and 3.0% respectively, while the pure titanium specimen showed a high dissipation factor of 33%. Leakage factor of the pure titanium was nearly 19 times that of the titanium-palladium alloy.

Although the leakage factors for the titanium-palladium alloy are greater than that of tantalum, they are well below the maximum acceptable limits for commercial aluminum electrolytic capacitors. It is particularly noteworthy in this connection that a superior leakage factor was obtained, viz, 0.0076 µa/V-µf., by vacuum heat treating the described titanium-palladium alloy prior to the anodizing process. This value is practically equivalent to that of commercial grade electrolytic tantalum. In a suitable process of such vacuum heat treatment, the titanium-palladium alloy is heated for about 20 minutes at about 1500° C. and at a pressure of about .5 to $.09 \times 10^{-3}$ Torr (mm. Hg).

It is apparent from the foregoing that the titanium-palladium alloy of the present invention provides extremely satisfactory results in electrolytic capacitor applications. The addition of a minor amount of palladium to titanium greatly increases the quality and stability of the anodized dielectric, as evidenced by the improved electrical characteristics such as lower leakage factor, lower dissipation factor and improved stability of capacitance with time. Aside from the above advantages, the present alloy offers substantial benefits over pure tantalum electrodes principally because of the much lower density of the alloy material and the generally lower cost. Thus, tantalum has a specific gravity of about 16 whereas the specific gravity of the present alloy is about 4.5. Taking into account the fact that tantalum itself at present costs about three times as much as the alloy material of the present invention, plus the saving due to the lower density of the alloy, it will be quite apparent that a considerable cost reduction can be effected in the manufacture of electrolytic capacitors without substantial sacrifice in the efficiency of operation of the capacitors.

The method of making the alloy of the present invention is not novel and does not form a part of the present invention. In general, the alloy may be made by conventional processes of vacuum arc melting and quenching steps, well known in the art. A suitable process, for example, is described in the article in Journal of Metal of October, 1951 on pages 881–888.

Although palladium in the specified amounts set forth above has provided particularly satisfactory results, proportions thereof different from those specified may also be found suitable. Moreover, it is contemplated that noble metals other than palladium may similarly be added to titanium to improve the characteristics of the latter for capacitor application, such as gold, platinum, ruthenium, rhodium, osmium, and iridium.

While the present invention has been described with reference to particular embodiments thereof, it will be understood that numerous modifications may be made by those skilled in the art without actually departing from the scope of the invention. Therefore, the appended claims are intended to cover all such equivalent variations as come within the true spirit and scope of the invention.

What we claim as new and desire to secure by Letters Patent of the United States is:

1. An electrical capacitor comprising, in combination, a pair of electrodes and an electrolyte in contact therewith, at least one of said electrodes comprising an alloy of titanium and a minor amount of palladium, said electrode having an anodic dielectric oxide film formed thereon.

2. An electrical capacitor comprising, in combination, a pair of electrodes and a dielectric oxide film formed on one of said electrodes, at least said one electrode comprising an alloy of titanium and 0.1% palladium.

3. An electrical capacitor comprising a first electrode layer comprising an alloy of titanium and .1% palladium, a dielectric film composed of an oxide of said alloy formed on said first electrode layer, and a second electrode layer superposed on said dielectric oxide film and spaced thereby from said first electrode layer.

4. An electrical capacitor comprising a first electrode layer composed of an alloy of titanium and .1% palladium, a dielectric film composed of an oxide of said alloy formed on said first electrode layer, a layer of semi-conductive material superposed on said dielectric oxide film, and a second electrode layer superposed on said layer of semi-conductive material and spaced by the latter and the dielectric film from said first electrode layer.

5. An electrode for electrical capacitors comprising an alloy of titanium and less than 1% of palladium, said electrode having a dielectric oxide film formed thereon.

6. An electrode for electrical capacitors comprising an alloy of titanium and about .1% palladium, said electrode having an anodic dielectric oxide film formed thereon.

References Cited by the Examiner

UNITED STATES PATENTS

| 1,668,863 | 5/1928 | Morrison | 317—233 |
| 2,024,240 | 12/1935 | Mershon | 317—230 |
| 2,299,228 | 10/1942 | Gray | 317—230 |
| 3,093,883 | 6/1963 | Haring et al. | 317—230 X |
| 3,098,182 | 7/1963 | Burnham | 317—230 |

JOHN W. HUCKERT, *Primary Examiner.*

JAMES D. KALLAM, *Examiner.*